United States Patent [19]
Peck

[11] Patent Number: 5,252,872
[45] Date of Patent: Oct. 12, 1993

[54] DIAMETRAL RUNOUT REDUCER FOR DRIVING A ROTARY SENSOR

[75] Inventor: David E. Peck, Rochester Hills, Mich.

[73] Assignee: Rockwell International Corporation, Pittsburgh, Pa.

[21] Appl. No.: 735,591

[22] Filed: Jul. 25, 1991

Related U.S. Application Data

[63] Continuation-in-part of Ser. No. 590,994, Oct. 1, 1990, Pat. No. 5,107,158.

[51] Int. Cl.$^5$ .......................... H02K 5/16; F16C 25/04
[52] U.S. Cl. ......................................... 310/90; 384/192
[58] Field of Search .................. 310/90; 384/192, 204, 384/206

[56] References Cited

U.S. PATENT DOCUMENTS 4,987,330  1/1991  Murphy et al. ..................... 310/217
5,107,158  4/1992  Peck ........................................ 310/90

Primary Examiner—Steven L. Stephan
Assistant Examiner—C. LaBalle

[57] ABSTRACT

A diametral runout reducer adapted to drive a rotor for exciting a stator of a speed sensor located in a differential carrier. The rotor is driven by a diametral runout reducer. The runout reducer includes an annular axially extending member having a first end which engages a vehicle axle shaft driven by the differential case and a second end which drives the rotor. Intermediate the first and second end of the runout reducer is a radial protrusion disposed proximate the second end defining a peripheral surface which extends equidistantly from a central point. The rotatable axially extending flange defines a bore whose central axis is maintained coincident with a preferred axis of rotation by means of bearings supporting the differential case. The bore has a dimensional interrelationship with a radial protrusion which facilitates sliding, thereby maintaining the central point of the annular axially extending flange coincident with the preferred central axis. In this manner, diametral runout of the second end with respect to the first end is reduced by a factor determined by the distance between the central point and the first end divided by the distance between the central point and the second end. A stator element in an axial flange on the adjusting ring.

6 Claims, 5 Drawing Sheets

DIAMETRAL RUNOUT REDUCER FOR DRIVING A ROTARY SENSOR

This application is a continuation-in-part of co-pending application U.S. Ser. No. 07/590,994 now U.S. Pat. No. 5,107,158 filed on Oct. 1, 1990 which is hereby incorporated by reference in this application.

BACKGROUND OF THE INVENTION

1. Description of the Related Art

This invention relates to sensors used for measuring the rotational speed of a shaft with respect to a fixed housing and, more particularly, a device packaged in an axle housing which may be used to drivingly engage a rotating shaft, reduce the diametral runout thereof and drive a rotary sensor.

2. Description of the Prior Art

Rotary sensors are utilized to detect the rotating speed of shafts used to propel and/or position bodies. An example of such technology is described and claimed in co-pending applications Ser. No. 07/463,736 now U.S. Pat. No. 5,111,098 and Ser. No. 07/463,737. To maintain control over such bodies, it is important to continuously monitor shaft rotational speed. Techniques to monitor rotary speed have become increasingly accurate. Along with such accuracy comes the necessity to drive the sensor via a rotating shaft having a minimal diametral runout. Costly expenditures are necessary to reduce diametral runout by reducing dimensional tolerances of the components which collectively generate the runout. Therefore, there is a need to inexpensively reduce the effect of runout of a shaft which is used to drive a rotary speed sensor. Further, there is a need to package such a device in an axle housing within the space available.

SUMMARY OF THE PRESENT INVENTION

The present invention is a diametral runout reducer for drivingly engaging a rotor of a rotary speed sensor which may be located in a differential carrier. The carrier includes a rotatable differential case bearingly supported therein, a first and second axle shaft driven by side gears of a differential assembly contained within the differential case further includes opposed rotatable axially extending flange members and the carrier includes nonrotatable adjusting rings arranged coaxially with respect to the flange members providing axial adjustment of the position of the differential case relative to the carrier. The runout reducer includes an annular axially extending member having a first end which drivingly engages an axle shaft and a second end which drives the rotor. Intermediate the first and second end of the runout reducer is a radially extending portion disposed proximate the first end so as to define a peripheral surface which extends equidistantly from a central point. The rotatable axially extending flange member defines a bore having a central axis which is maintained coincident with a preferred axis of rotation by means of bearings supporting the differential case. The bore has a dimensional interrelationship with the radially extending portion which facilitates sliding relation therebetween, thereby maintaining the central point of the annular axially extending member coincident with the preferred central axis. In this manner, diametral runout of the second end with respect to the first end is reduced by a factor which may be determined by calculating the distance between the central point and the first end divided by the distance between the central point and the second end. A stator element may be disposed in an axial flange disposed on the adjusting ring and extending in a direction opposite the differential case. In such a manner, the stator is maintained proximate the rotor as to provide an electrical signal indicative of the rotational speed of the axle shaft. Both axle shafts may be monitored by incorporating sensors in opposing adjusting rings and drivingly engaging the rotors thereof with respective axle shafts.

A second embodiment of the present invention features a second rotor disposed on the rotatable axially extending flange member. A second cooperating stator element may be disposed in the axial flange disposed on the adjusting ring and maintained proximate the second rotor so as to provide an electrical signal indicative of the rotational speed of the differential case.

These and other aspects of the present invention will become more readily apparent by reference to the following detailed description of the embodiments as shown in the drawings.

DETAILED DESCRIPTION OF THE DRAWINGS

DESCRIPTION OF THE PREFERRED EMBODIMENT

Figure 1:
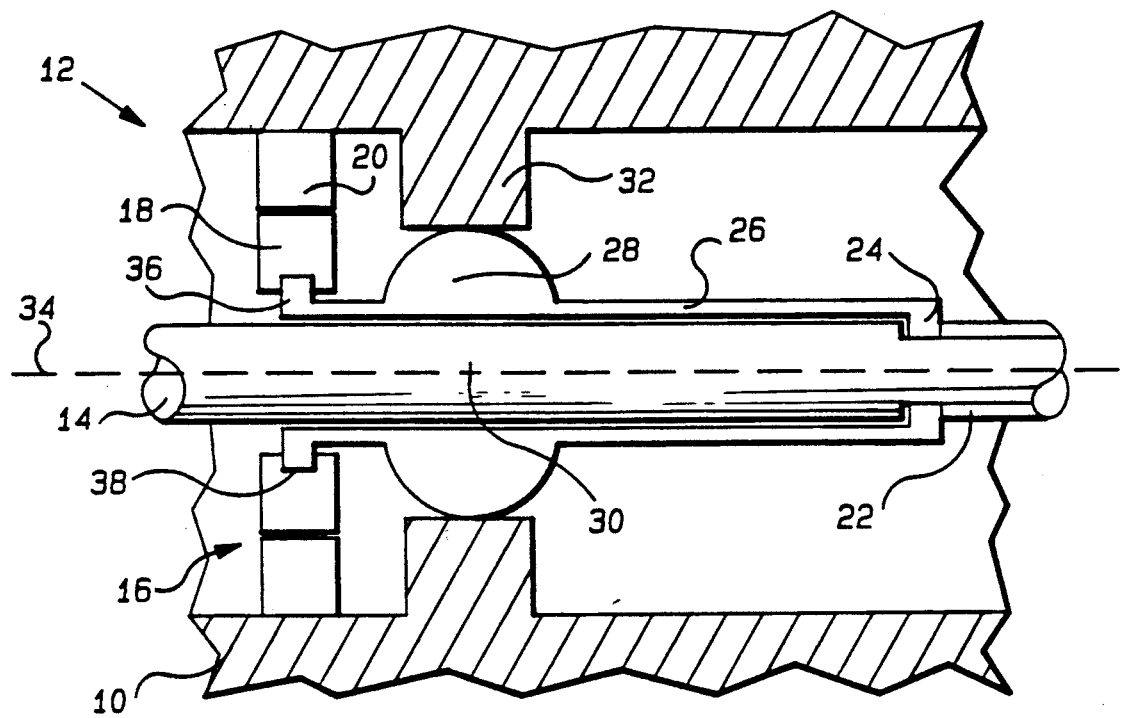
FIG. 1 is a cross-section of the preferred embodiment of the present invention.
Figure 3:
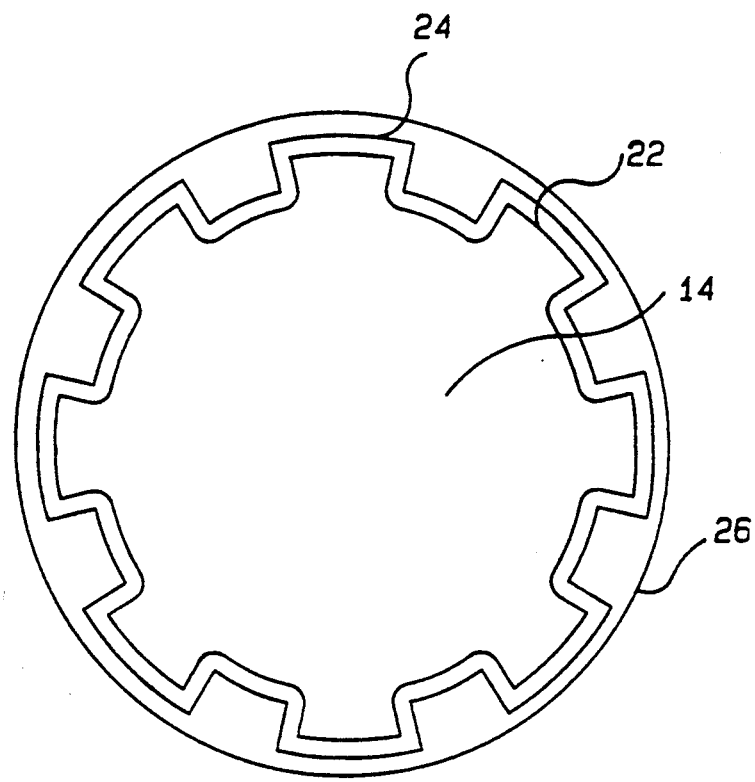
FIG. 3 is a cross-sectional view of the splined engagement between the sleeve of the present invention and a rotatable shaft.
Figure 4:
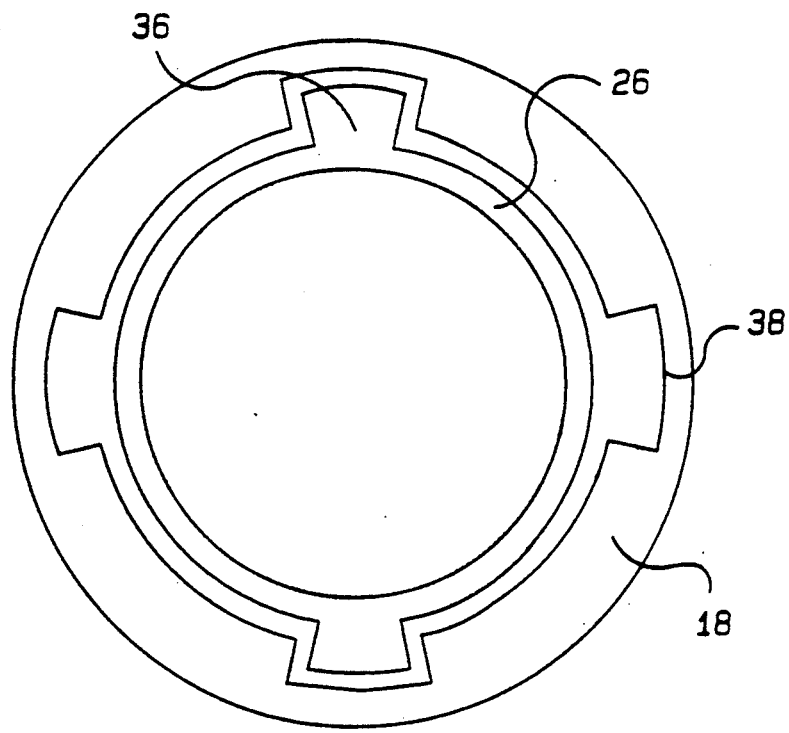
FIG. 4 is a cross-sectional view of the splined engagement between the sleeve of the present invention and a rotary sensor.

The principle of the present invention is illustrated in FIG. 1 includes a housing 10 having opening 12 defined therein through which shaft 14 passes. Shaft 14 is supported by bearings (not shown) for rotation to provide motive force to propel a vehicle (for example). Speed sensor 16 has a rotating portion 18 and a stationary portion 20 secured to housing 10. An example of a sensor which may be driven by the apparatus of the present invention is described in now pending U.S. Pat. No. 5,111,098 herein incorporated by reference. External splines 22 formed on shaft 14 mate with respective internal splines 24 formed on sleeve 26 to accomplish driving engagement therebetween. (See FIG. 3). The mating splines 22, 24 engage one another in a manner in which any diametral runout present in shaft 14 will be imparted directly to sleeve 26. Sleeve 26, as shown in FIG. 1, includes a radially extending spherical protrusion 28 which presents a spherical annular profile having center 30. Housing 10 includes a reduced diameter portion 32 which slidingly engages protrusion 28 to maintain center 30 coincident with a preferred axis of rotation, axis 34. In this manner, the diametral runout of sleeve 26 in the portion of protrusion 28 is totally eliminated. Sleeve 26 further includes external spline 36 which mates with internal spline 38 to rotatively drive portion 18 of sensor 16. (See FIG. 4). Sleeve 26 may be made from machined metal, die cast metal, or an injection molded plastic such as nylon.

Figure 2:
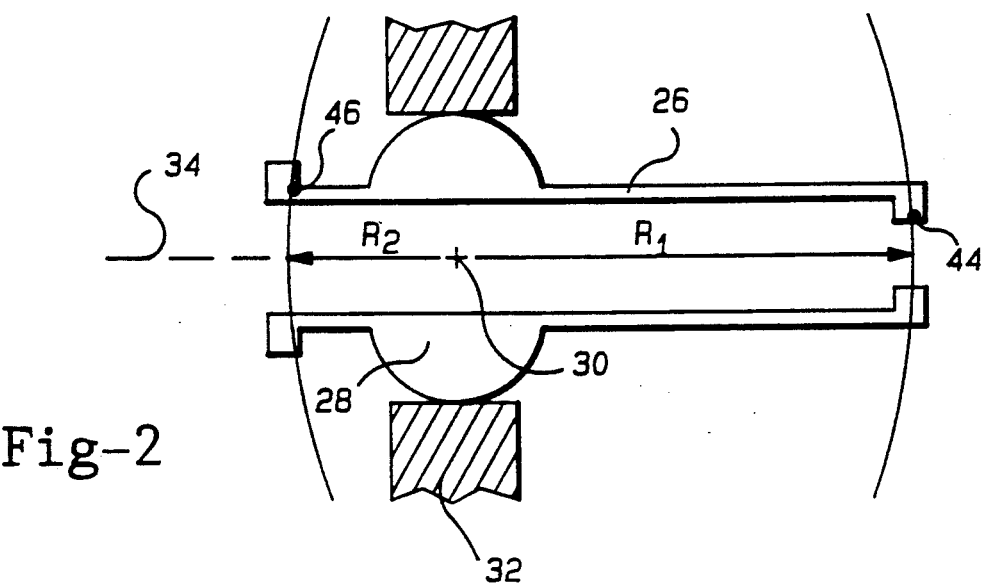
FIG. 2 is a diagrammatic representation of the reduction in diametral runout achieved in the present invention.

FIG. 2 further illustrates the phenomena by which diametral runout reduction is accomplished by the present invention. That is, diametral runout of sleeve 26 at the end driven by shaft 14 (not shown) follows an arc being traced by a point 44 along a radius of length R1. Center point 30 of spherical annular protrusion 28 is maintained coincident with the preferred axis of rotation 34 by sliding engagement with annular section 32. In this manner, all diametral radial runout is eliminated from sleeve 26 in the region of spherical annular protrusion 28. The other end of sleeve 26 engages and drives a rotary sensor (not shown). Diametral runout present in the portion of sleeve 26 driving the sensor is illustrated as following an arc being traced by point 46 along a radius of length R2. The arc length traveled by point 46 is reduced from the length traveled by point 44 by a factor which may be determined by calculating R1/R2. Selection of the dimensions R1 and R2 may be made to accommodate varying amounts of diametral runout as may be demanded by the specific application.

Figure 5:
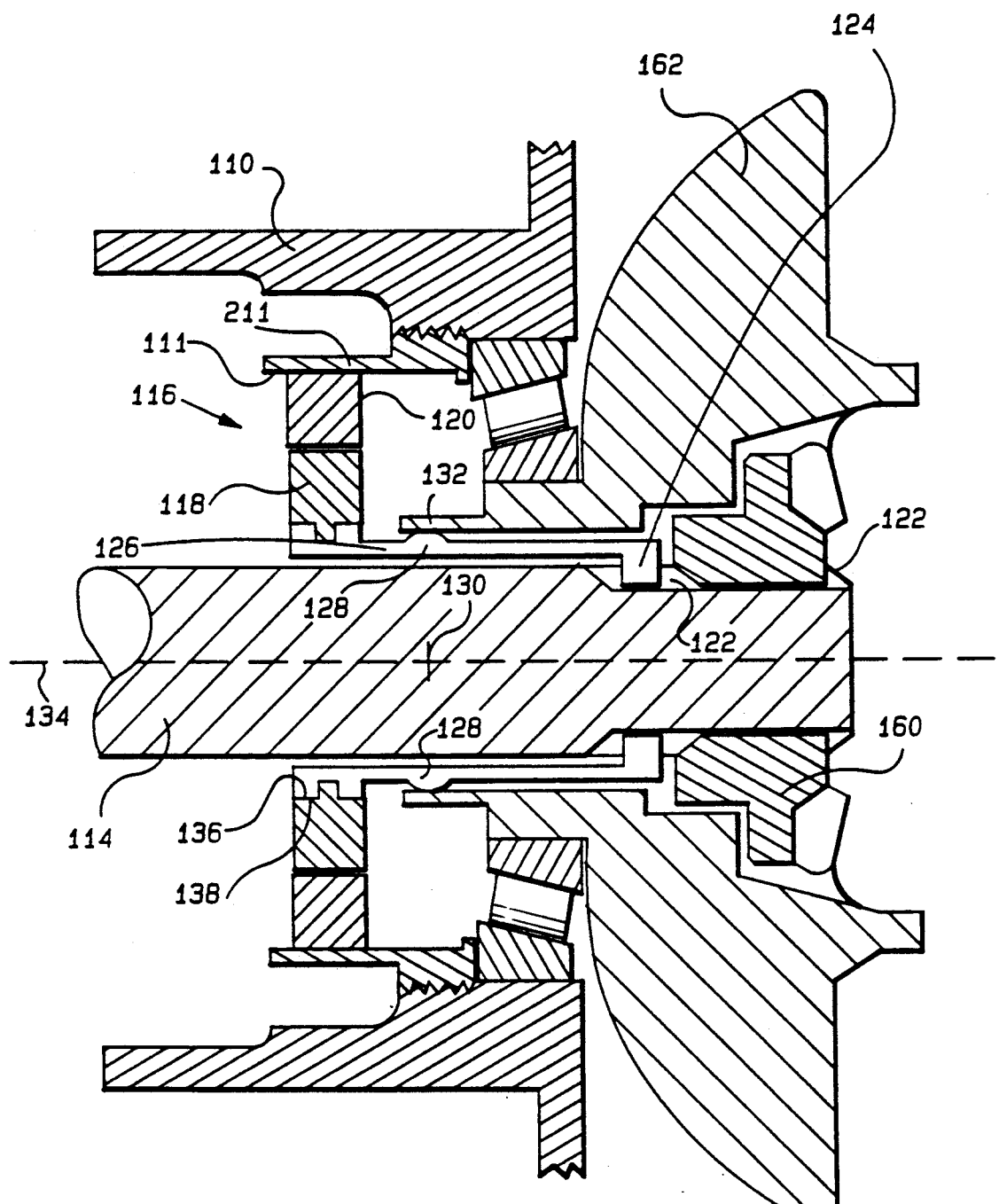
FIG. 5 is the present invention incorporated in a vehicle axle housing.

FIG. 5 illustrates the incorporation of the diametral runout reducer in axle housing 110 for driving rotary sensor 116 comprising rotating portion 118 and fixed portion 120. Axle shaft 114 includes external splines 122 which engage respective internal splines in side gear 160. Side gear 160 is supported for rotation in differential case 162 as shown. Sleeve 126 includes internal splines 124 which matingly engage external splines 122 in axle shaft 114. Another technique for drivingly engaging sleeve 126 and axle shaft 114 is to produce and engage mating splines on sleeve 126 and side gear 116. In this manner, sleeve 126 is rotatably driven such that any diametral runout in shaft 114 is directly imparted to sleeve 126. Sleeve 126 includes a radially extending spherical annular protrusion 128 having center 130. Differential case 162 includes an extension 132 which slidingly engages protrusion 128 to maintain center 130 coincident with axis 134. In this manner, the diametral runout of sleeve 126 in the region of annular protrusion 128 is totally eliminated. Sleeve 126 further includes external splines 136 which mate with internal splines 138 to rotatively drive portion 118 of sensor 116. Fixed portion 120 is maintained in bore 111 of an axially extending flange disposed on adjuster ring 211 by means of interference fit. Snap-rings or similar retainers known in the art may be used to accomplish retention. The immediate proximate relationship of fixed portion 120 and rotating portion 118 provides an electrical signal upon relative rotation which is indicative of the speed or rotation of axle shaft 114. The reduction in diametral runout accomplished by the present invention is a result of the phenomena described in relation to the preferred embodiment of the present invention as illustrated in FIG. 2.

Figure 6:
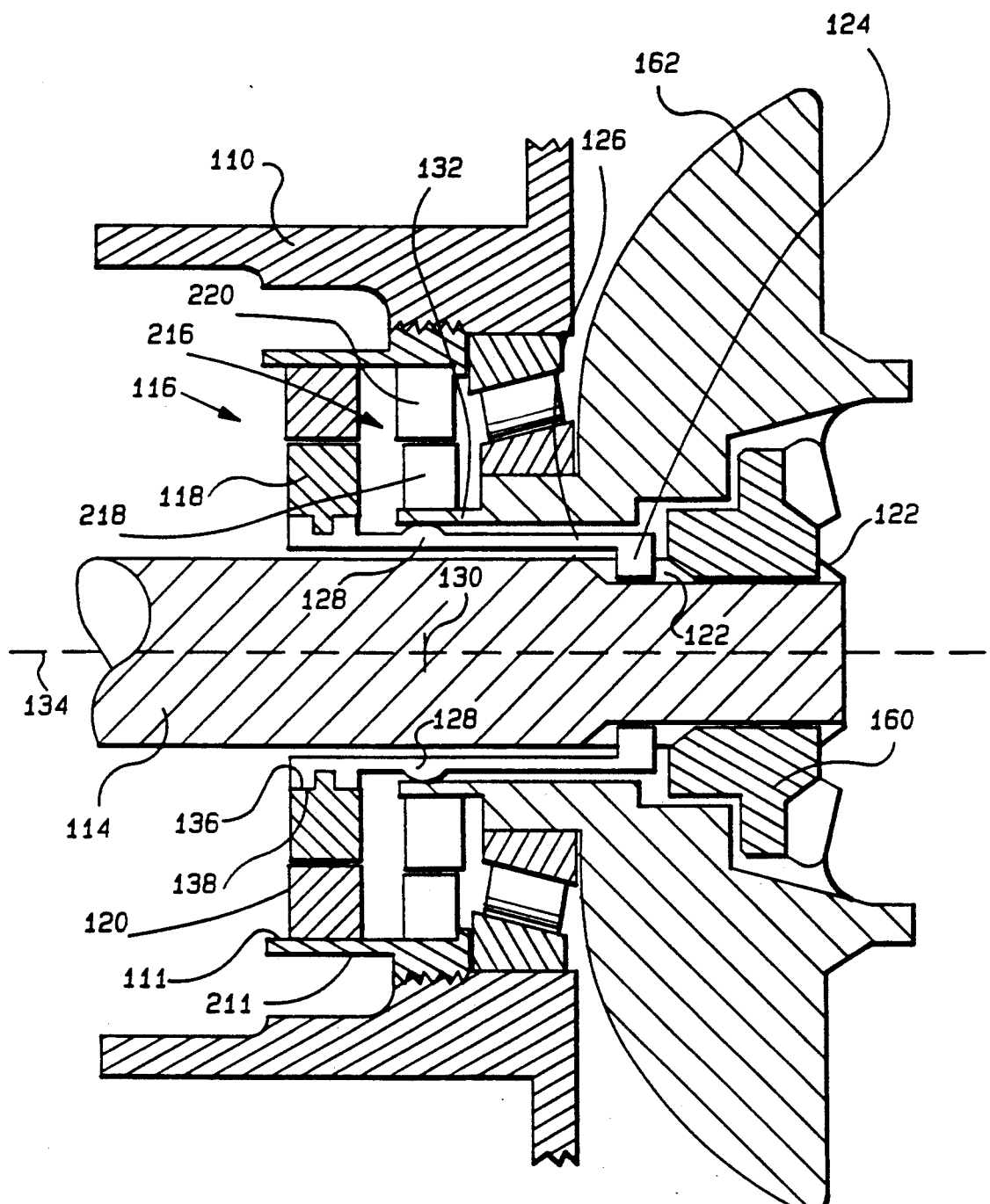
FIG. 6 is the present invention incorporated in a vehicle axle housing featuring two rotary sensors mounted side by side.

FIG. 6 illustrates the incorporation of the diametral runout reducer in axle housing 110 which further includes a second rotary sensor 216 comprising rotating portion 218 and fixed portion 220. Flange 132 drives rotating portion 218 by means of frictional engagement therewith. Fixed portion 220 is disposed in bore 111 of an axially extending flange disposed on adjuster ring 211 by means of an interference fit. The immediate proximate relationship of fixed portion 220 and rotating portion 218 provides an electrical signal upon relative rotation which is indicative of the speed of rotation of differential case 162. It is known in the art that by knowing the rotating speed of one axle and the speed of the differential case (which is the average of the axle speeds) both axle speeds may be determined.

Figure 7:
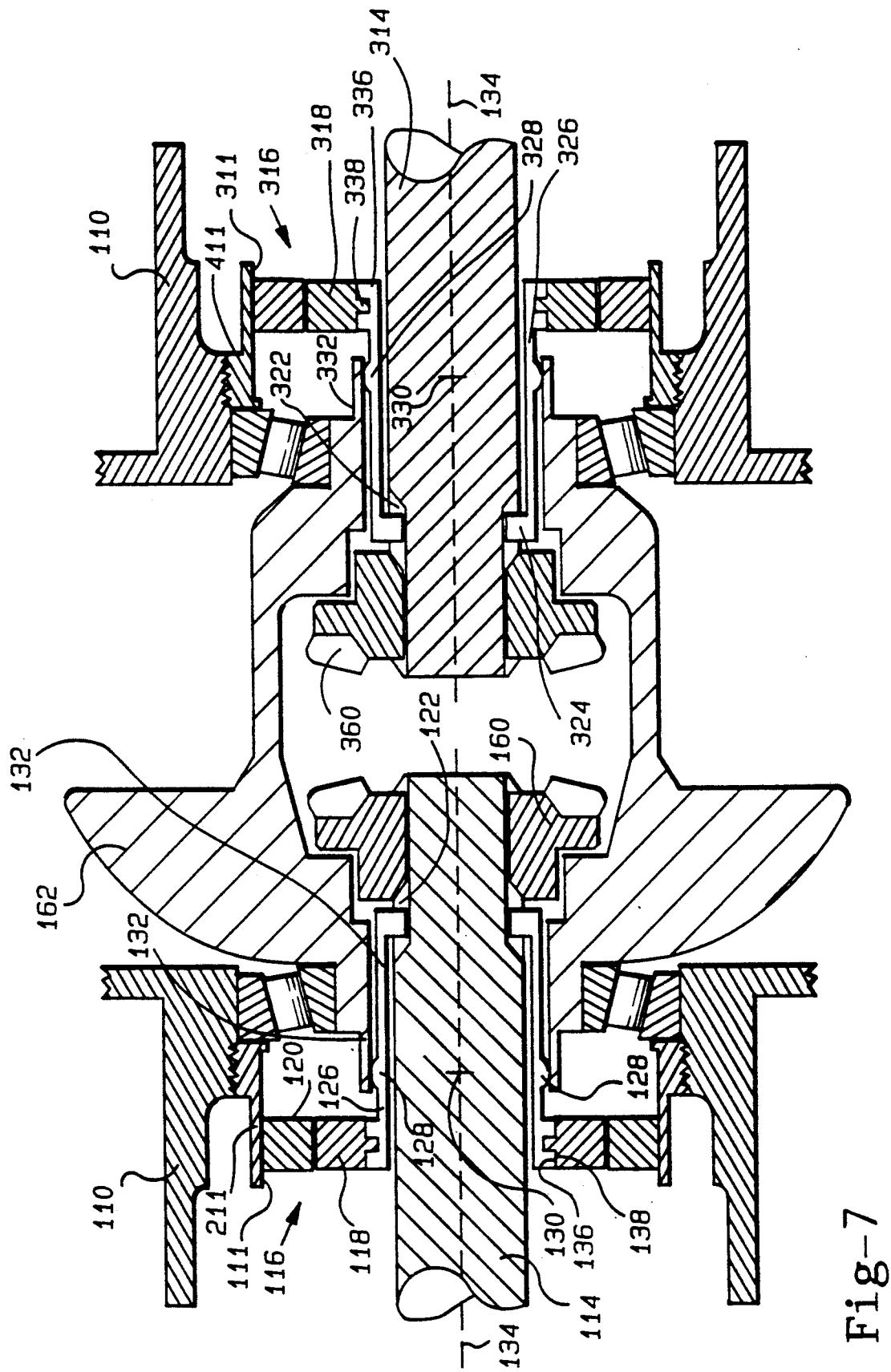
FIG. 7 is the present invention incorporated in a vehicle axle housing featuring two rotary sensors mounted on opposing sides.

FIG. 7 illustrates the incorporation of the diametral runout reducer of the present invention included on opposing sides of axle housing 110 for driving rotary sensor 116 and 316. FIG. 7 further incorporates components in addition to that included and described with respect to FIG. 5. Similar components are numbered identically with the exception of 100 and 300 series distinguishing opposing sides. Components on the right most side (as seen in FIG. 7) have previously been described with respect to FIG. 5. Additional components associated with the left most side, as seen in FIG. 7, include a rotary sensor 316 comprising rotating portion 318 and fixed portion 320. Axle shaft 314 includes external spines 322 which engage respective internal splines in side gear 360. Side gear 360 is supported for rotation in differential case 162 as shown. Sleeve 326 includes internal splines 324 which matingly engage external splines 322 in axle shaft 314. In this manner sleeve 326 is rotatably driven such that any diametral runout in shaft 314 is directly imparted to sleeve 326. Sleeve 326 includes radially extending spherical annular protrusion 328 having center 330. Differential case 162 includes extension 332 which slidingly engages protrusion 328 to maintain 330 coincident with axis 134. In this manner, the diametral runout of sleeve 326 in the region of annular protrusion 328 is totally eliminated. Sleeve 326 further includes external splines 336 which mate with internal splines 338 to rotatively drive portion 318 of sensor 316. Fixed portion 320 is maintained in bore 311 of an axially extending flange disposed on adjuster ring 411 by means of interference fit. The immediate proximate relationship of fixed portion 320 and rotating portion 318 provides an electrical signal upon relative rotation which is indicative of the speed or rotation of axle shaft 314. The reduction in diametral runout accomplished by the present invention is a result of the phenomena described in relation to the preferred embodiment of the present invention as illustrated in FIG. 2.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A rotary portion for exciting a respective sationary portion of a speed sensor disposed within a differential including a rotatable differential case bearingly supported in said carrier, an axle shaft driven by a side gear of said differential contained within said differential case, said differential case including a rotatable axially extending flange member and said carrier including a nonrotatable adjusting ring arranged coaxially with respect to said flange member providing axial adjustment of the position of the differential case relative to said carrier wherein the improvement comprises;

an annular axially extending member coaxially disposed about said axle shaft having a first end drivingly engaged therewith;

a second opposing end of said annular member drivingly engaging said rotary portion;

said annular member having a radially extending portion disposed proximate said second end defining a peripheral surface which extends equidistantly from a central point;

said rotatable axially extending flange member defining a bore having a central axis which is maintained coincident with a preferred axis of rotation;

said bore having a dimensional interrelationship with said radially extending portion which facilitates a sliding relation therebetween, thereby maintaining said central point coincident with said central axis wherein diametral runout of said second end with respect to said first end is reduced by a factor which may be determined by calculating the distance between the central point and the first end divided by the distance between the central point and the second end; and a stationary portion disposed within an axial flange disposed on said adjusting ring and extending in a direction opposite said differential case, said stationary portion being thereby maintained proximate said rotary portion for producing an electrical signal indicative of the relative rotational speed of said flange member and said drivingly engaged annular axially extending member.

2. The invention of claim 1 wherein said annular axially extending member is drivingly engaged with said axle shaft by mating spline means disposed on said axle and said annular axially extending member.

3. The invention of claim 1 wherein said annular axially extending member is drivingly engaged with said axle shaft by mating splines disposed on said side gear and said annular axially extending member.

4. A first and second rotary portion for exciting respective first and second stationary portion of speed sensors disposed within a differential including a rotatable differential case bearingly supported in said carrier, an axle shaft driven by a side gear of said differential contained within said differential case, said differential case including a rotatable axially extending flange member and said carrier including a nonrotatable adjusting ring arranged coaxially with respect to said flange providing axial adjustment of the position of the differential case relative to said carrier wherein the improvement comprises;

said first rotary member drivingly connected to a diametral runout reducer;

said second rotary member drivingly connected to said flange member;

said diametral runout reducer comprising;

an annular axially extending member coaxially disposed about said axle shaft having a first end drivingly engaged therewith;

a second opposing end of said first annular member drivingly engaging said first rotary member;

said annular member having a radially extending portion disposed proximate said second end defining a peripheral surface which extends equidistantly from a central point;

said rotatable axially extending flange member defining a bore having a central axis which is maintained coincident with a preferred axis of rotation;

said bore having a dimensional interrelation with said radially extending portion which facilitates a sliding relation therebetween, thereby maintaining said central point coincident with said central axis wherein diametral runout of said second end with respect to said first end is reduced by the distance between the central point and the first end divided by the distance between the central point and the second end; and first and second stationary portion disposed within an axial flange disposed on said adjusting ring and extending in a direction opposite said differential case, said first and second stationary portion being thereby maintained proximate said first and second rotary portions for producing an electrical signal indicative of the rotational speed of said drivingly engaged flange member and said annular axially extending member.

5. The invention of claim 4 wherein said annular axially extending member is drivingly engaged with said axle shaft by mating spline means disposed on said axle and said annular axially extending member.

6. The invention of claim 4 wherein said annular axially extending member is drivingly engaged with said axle shaft by mating splines disposed on said side gear and said annular axially extending member.

* * * * *